(12) United States Patent
Feng et al.

(10) Patent No.: US 12,312,471 B2
(45) Date of Patent: May 27, 2025

(54) HIGH-TOUGHNESS AND HIGH-STRENGTH WOOD-PLASTIC COMPOSITES AND PREPARATION METHOD THEREOF

(71) Applicant: South China University of Technology, Guangdong (CN)

(72) Inventors: Yanhong Feng, Guangdong (CN); Zixin Yuan, Guangdong (CN); Hang Sun, Guangdong (CN); Xiaochun Yin, Guangdong (CN); Jinping Qu, Guangdong (CN); Xinliang Zou, Guangdong (CN)

(73) Assignee: South China University of Technology, Guangzhou (CN)

( * ) Notice: Subject to any disclaimer, the term of this patent is extended or adjusted under 35 U.S.C. 154(b) by 232 days.

(21) Appl. No.: 17/438,811

(22) PCT Filed: Jan. 11, 2021

(86) PCT No.: PCT/CN2021/071025
§ 371 (c)(1),
(2) Date: Sep. 13, 2021

(87) PCT Pub. No.: WO2021/190089
PCT Pub. Date: Sep. 30, 2021

(65) Prior Publication Data
US 2023/0002616 A1     Jan. 5, 2023

(30) Foreign Application Priority Data
Mar. 27, 2020     (CN) .......................... 202010228663.4

(51) Int. Cl.
*C08L 97/02*     (2006.01)
*C08L 23/12*     (2006.01)

(52) U.S. Cl.
CPC ............... *C08L 97/02* (2013.01); *C08L 23/12* (2013.01); *C08L 2205/02* (2013.01); *C08L 2205/035* (2013.01); *C08L 2207/06* (2013.01)

(58) Field of Classification Search
CPC ...... C08L 97/02; C08L 23/12; C08L 2205/02; C08L 2205/035; C08L 2207/06
See application file for complete search history.

(56) References Cited

U.S. PATENT DOCUMENTS

2005/0154094 A1*  7/2005  Maeda .................... C08L 97/02
                                                                        524/502

FOREIGN PATENT DOCUMENTS

| CN | 101219565 A | 7/2008 |
|---|---|---|
| CN | 102604404 A | 7/2012 |

(Continued)

OTHER PUBLICATIONS

English translation of CN103102572 (Year: 2013).*
English Translation of CN 105462064 (Year: 2016).*

*Primary Examiner* — Ling Siu Choi
*Assistant Examiner* — Andrea Wu
(74) *Attorney, Agent, or Firm* — Morse, Barnes-Brown & Pendleton, P.C.; Martin Z. Zhang

(57) ABSTRACT

The invention relates to the technical field of composites, in particular to a high-toughness and high-strength wood-plastic composite and a preparation method thereof. The wood-plastic composite is prepared from the following preparation raw materials in parts by mass: 30-50 parts of wood flour, 11-20 parts of high molecular weight polyethylene, 30-52 parts of polypropylene and 2-10 parts of an interface modifier. Polypropylene is used as a main component of a plastic matrix; high molecular weight polyethylene is used as a secondary component of the plastic matrix and has a toughening effect; wood flour is used as a filler to improve the strength of the wood-plastic composite; the (Continued)

interface modifier can improve the interface bonding between the wood flour and the plastic matrix, and all components have a synergistic effect, so that the obtained wood-plastic composite has high toughness and high strength.

4 Claims, 1 Drawing Sheet

(56) References Cited

FOREIGN PATENT DOCUMENTS

| | | |
|---|---|---|
| CN | 102942798 A | 2/2013 |
| CN | 103102572 A | 5/2013 |
| CN | 104559278 A | 4/2015 |
| CN | 105462064 A | 4/2016 |
| CN | 106349726 A | 1/2017 |
| CN | 109705453 A | 5/2019 |
| CN | 110903527 A | 3/2020 |
| CN | 111363239 A | 7/2020 |
| JP | 2019/199009 A | 11/2019 |
| KR | 2017/0032571 A | 3/2017 |

* cited by examiner

HIGH-TOUGHNESS AND HIGH-STRENGTH WOOD-PLASTIC COMPOSITES AND PREPARATION METHOD THEREOF

CROSS REFERENCE TO RELATED APPLICATION

This patent application is the national stage of International Patent Application No. PCT/CN2021/071025, filed on Jan. 11, 2021, which claims the benefit and priority of Chinese Patent Application No. 202010228663.4 filed on Mar. 27, 2020, the disclosures of being incorporated by reference herein in their entirety as part of the present application.

TECHNICAL FIELD

The invention relates to the technical field of composites, in particular to a high-toughness and high-strength wood-plastic composite and a preparation method thereof.

BACKGROUND ART

Wood-plastic composites are compounded by wood flour and other biomass, plastics and corresponding processing aids. They have the advantages of low cost, green and recyclable, and can replace plastics and logs. They are currently used in the fields of packaging, construction and home decoration, gardens and landscapes, and vehicles and ships.

Due to the incompatibility between the high-strength polar biomass raw materials and the non-polar plastic matrix, the toughness of wood-plastic composites is poor, which limits the application range of wood-plastic composites. Adding rubber and other elastomer materials can effectively improve the toughness of wood-plastic composites, but at the same time it will cause the strength of wood-plastic composites to decrease.

SUMMARY

The purpose of the present invention is to provide a high-toughness and high-strength wood-plastic composite and a preparation method thereof. The wood-plastic composite of the present invention has both high toughness and high strength.

In order to achieve the above-mentioned purpose of the invention, the present invention provides the following technical solutions:

The present invention provides a high-toughness and high-strength wood-plastic composite, comprising the following preparation raw materials in parts by mass: 30-50 parts of wood flour, 11-20 parts of high molecular weight polyethylene, 30-52 parts of polypropylene, and 2-10 parts of interface modifier.

Preferably, a viscosity average molecular weight of the high molecular weight polyethylene is 400,000-3,000,000.

Preferably, the interface modifier includes one or more selected from the group of maleic anhydride grafted polyethylene, maleic anhydride grafted polypropylene, and maleic anhydride grafted EPDM rubber.

Preferably, the particle size of the wood flour is 40-100 mesh.

Preferably, it further includes an antioxidant, and the mass of the antioxidant is 0.1-0.3% of the mass of the high molecular weight polyethylene.

Preferably, the antioxidant is antioxidant 1010, 1076, 168, 264, 1098, B215, B225, DLTP, DSTP or TNPP.

The present invention provides a method for preparing the wood-plastic composite in the above solution, comprises the following steps:

mixing the preparation raw materials to obtain a mixture;

extruding the mixture using an extruder to obtain a wood-plastic composite; the extruder is an extruder capable of generating an elongational flow field.

Preferably, the mixing rotation speed is 500-1000 rpm, and the time is 10-20 min.

Preferably, the extruder is an eccentric rotor extruder or a twin screw extruder.

Preferably, after the extrusion, it further includes the molding of the extruded material.

The present invention provides a high-toughness and high-strength wood-plastic composite, comprising the following preparation raw materials in parts by mass: 30-50 parts of wood flour, 11-20 parts of high molecular weight polyethylene, 30-52 parts of polypropylene, and 2-10 parts of interface modifier. The present invention uses polypropylene as the main component of the plastic matrix, uses high molecular weight polyethylene as the secondary component of the plastic matrix, which has a toughening effect; and uses wood flours as a filler to increase the strength of the wood-plastic composite; the interface modifier can improve the interface combination between wood flour and plastic matrix, and all components have a synergistic effect, so that the obtained wood-plastic composite has high toughness and high strength.

The present invention provides a preparation method of the wood-plastic composite, which includes the following steps: mixing each preparation raw material to obtain a mixture; using an extruder to extrude the mixture to obtain the wood-plastic composite; the extruder is an extruder capable of generating an elongational flow field.

The present invention uses an extruder capable of generating an elongational flow field to extrude the mixture. Under the action of the elongational flow field, the molecular chains of high molecular weight polyethylene and polypropylene are oriented along the direction of the flow field, and the crystallinity increases accordingly, the molecular chain orientation and high crystallinity of the plastic matrix (referring to high molecular weight polyethylene and polypropylene) are conducive to improving the strength of wood-plastic composites; under the action of the elongational flow field, the high molecular weight polyethylene is uniformly dispersed in the polypropylene, with a smaller particle size, the mutual diffusion between molecular chains of high molecular weight polyethylene and polypropylene is enhanced, the interface area between the two is increased, the interface thickness is thickened, and the interface bonding is strengthened, which are beneficial for high molecular weight polyethylene with high toughness to play a toughening role in wood-plastic composites. At the same time, the elongational flow field also promotes the wrapping of wood flours by polypropylene molecular chains, and the adhesion between wood flour and polypropylene is strengthened, which is beneficial to improve the toughness and strength of wood-plastic composites.

In addition, compared with the prior art of improving the compatibility between biomass raw material and plastic matrix through alkali treatment, acetylation and other chemical treatment to achieve the purpose of improving the toughness of wood-plastic composite (chemical treatment has the disadvantage of cumbersome steps), the preparation method of the invention is simpler and more efficient.

DETAILED DESCRIPTION OF THE EMBODIMENTS

Figure 1:
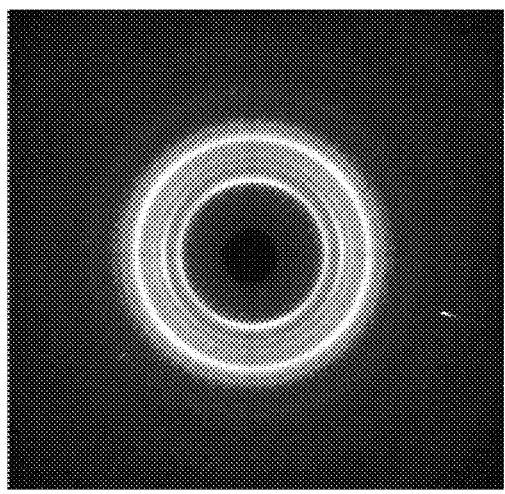
FIG. 1 is a two-dimensional wide-angle X-ray diffraction image of the orientation of the plastic matrix in the wood-plastic composite prepared in Example 1.

The present invention will be further described below in conjunction with the embodiments and drawings.

The present invention provides a high-toughness and high-strength wood-plastic composite, comprising the following preparation raw materials in parts by mass: 30-50 parts of wood flour, 11-20 parts of high molecular weight polyethylene, 30-52 parts of polypropylene, and 2-10 parts of interface modifier.

In the present invention, without special instructions, the raw materials used are all commercially available products well known in the art.

In terms of parts by mass, the raw materials of the high-toughness and high-strength wood-plastic composite provided by the present invention comprise 30-50 parts of wood flour, preferably 35-40 parts, more preferably 40 parts. In the present invention, the particle size of the wood flour is preferably 40-100 mesh, more preferably 50-90 mesh, and still more preferably 60-80 mesh. The present invention has no special requirements on the type of wood flour. In the embodiments of the present invention, eucalyptus wood flour is specifically used. In the present invention, the wood flour as a filler can improve the strength of the wood-plastic composite material.

Based on the mass parts of the wood flour, the raw materials for preparing the high-toughness and high-strength wood-plastic composite provided by the present invention comprise 11-20 parts of high molecular weight polyethylene, preferably 11-18 parts, more preferably 13-17 parts. In the present invention, the viscosity average molecular weight of the high molecular weight polyethylene is preferably 400,000-3,000,000, more preferably 800,000-2,000,000, still more preferably 800,000-1,500,000, and most preferably 800,000. In the present invention, the high molecular weight polyethylene serves as a component of the plastic matrix and has a toughening effect. The use of the polyethylene with the above viscosity average molecular weight in the present invention is beneficial to improve the toughness of the wood-plastic composite.

Based on the mass parts of the wood flour, the preparation raw materials for preparing the high-toughness and high-strength wood-plastic composite provided by the present invention comprise 30-52 parts of polypropylene, preferably 33-50 parts, more preferably 35-48 parts. In the present invention, the polypropylene is used as the main component of the plastic matrix.

Based on the mass parts of the wood flour, the raw materials for preparing the high-toughness and high-strength wood-plastic composite provided by the present invention comprise 2-10 parts of the interface modifier, preferably 4-8 parts, more preferably 5-6 parts. In the present invention, the interface modifier preferably includes one or more selected from the group of maleic anhydride grafted polyethylene, maleic anhydride grafted polypropylene, and maleic anhydride grafted EPDM rubber. When several of the above substances are included, the invention has no special requirement on the ratio of each substance, and any ratio can be used. The interface modifier of the present invention can improve the interface bonding between wood flour and plastic matrix.

Preferably, the preparation raw materials for preparing the high-toughness and high-strength wood-plastic composite provided by the present invention further include an antioxidant, and the mass of the antioxidant is preferably 0.1-0.3% of the mass of the high molecular weight polyethylene. In the present invention, the antioxidant is preferably antioxidant 1010, 1076, 168, 264, 1098, B215, B225, DLTP, DSTP or TNPP.

The present invention provides a preparation method of the wood-plastic composite described in the above solution, which includes the following steps:

mixing the preparation raw materials to obtain a mixture;

extruding the mixture using an extruder to obtain a wood-plastic composite; the extruder is an extruder capable of generating an elongational flow field.

In the present invention, each preparation raw material is mixed to obtain a mixture. In the present invention, the rotation speed of the mixing is preferably 500-1000 rpm, more preferably 600-900 rpm; the mixing time is preferably 10-20 min, more preferably 15-20 min. In the present invention, the mixing is preferably performed in a high-speed mixer.

After the mixture is obtained, the present invention uses an extruder to extrude the mixture to obtain a wood-plastic composite. In the present invention, the extruder is an extruder capable of generating an elongational flow field, preferably an eccentric rotor extruder or a twin screw extruder, and more preferably an eccentric rotor extruder. When an eccentric rotor extruder is used, the temperature of each heating section from feeding to die heat is preferably 130-150° C., 190-210° C., and 190-210° C., respectively; the processing rotation speed is preferably 15-30 rpm. When a twin-screw extruder is used, the temperature of each heating section from feeding to die heat is preferably 80-130° C., 100-160° C., 120-190° C., 180-210° C., 180-210° C., and 180-210° C., respectively.

The present invention uses an extruder capable of generating an elongational flow field to extrude the mixture. Under the action of the elongational flow field, the molecular chains of high molecular weight polyethylene and polypropylene are oriented along the direction of the flow field, and the crystallinity increases accordingly, the molecular chain orientation and high crystallinity of the plastic matrix (referring to high molecular weight polyethylene and polypropylene) are conducive to improving the strength of wood-plastic composites; under the action of the elongational flow field, the high molecular weight polyethylene is uniformly dispersed in the polypropylene, with a smaller particle size, the mutual diffusion between the molecular chains of high molecular weight polyethylene and polypropylene is enhanced, the interface area between the two is increased, the interface thickness is thickened, and the interface bonding is strengthened, which are beneficial for high molecular weight polyethylene with high toughness to play a toughening role in wood-plastic composites. At the same time, the elongational flow field also promotes the wrapping of wood flours by the polypropylene molecular chains, and the adhesion between wood flour and polypropylene is strengthened, which is beneficial to improve the toughness and strength of wood-plastic composites.

After the extrusion, the present invention preferably molds the extruded material to obtain a wood-plastic composite product. The invention has no special requirements for the molding method, and the molding method known in the art can be adopted, which can be specifically but not limited to compression molding, extrusion molding, and injection molding.

The high-toughness and high-strength wood-plastic composite provided by the present invention and the preparation method thereof will be described in detail below in conjunction with examples, but they cannot be understood as limiting the protection scope of the present invention.

The wood flour used in the following examples is commercially available eucalyptus wood flour with a particle size of 80 mesh; the high molecular weight polyethylene used was purchased from Shanghai Lianle Chemical Technology Co., Ltd., models 2080 and 2020, the viscosity average molecular weight of model 2080 was 800,000, the viscosity average molecular weight of model 2020 was 2 million; the polypropylene used was purchased from Taiwan Chemical Fiber Co., Ltd., model K7005AG; the maleic anhydride grafted polypropylene used was purchased from Dow DuPont Co., Ltd., model Fusabond P353; the EPDM rubber used was purchased from Dow DuPont Co., Ltd., model NORDEL IP 3720P; the maleic anhydride grafted EPDM rubber used was purchased from Dow DuPont Co., Ltd., model Fusabond N416; antioxidant 1010 was purchased from BASF AG, Germany.

Example 1

Preparation raw materials: in parts by mass, 40 parts of eucalyptus wood flour, 11 parts of high molecular weight polyethylene (model 2080), 44 parts of polypropylene, 5 parts of maleic anhydride grafted polypropylene, and the mass of antioxidant 1010 was 0.1% of the mass of high molecular weight polyethylene;

The eucalyptus wood flour, high molecular weight polyethylene, polypropylene, maleic anhydride grafted polypropylene, and antioxidant 1010 were mixed in a high-speed mixer at a speed of 500 rpm for 15 min at room temperature;

The mixed raw materials were extruded using an eccentric rotor extruder, the temperature of each heating section of the eccentric rotor extruder from feeding to the die heat was 150° C., 200° C., and 200° C., respectively, the rotation speed of the eccentric rotor extruder was set to 30 rpm, to get a block material;

The above-mentioned block material was molded by a hot press to obtain a wood-plastic composite.

FIG. 1 is a two-dimensional wide-angle X-ray diffraction image of the orientation of the plastic matrix in the wood-plastic composite prepared in Example 1; FIG. 1 shows that the plastic matrix in the wood-plastic composite has obvious orientation, which is conducive to improving the strength of the wood-plastic composite.

Figure 2:
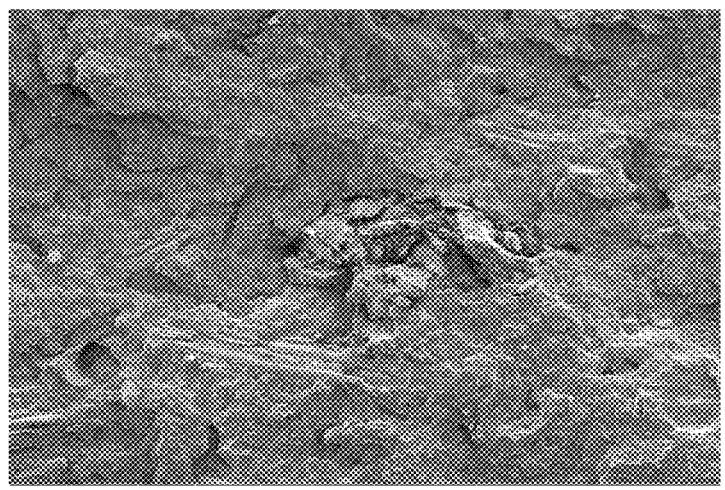
FIG. 2 is a scanning electron microscope image of the liquid nitrogen quenching section of the wood-plastic composite prepared in Example 1.

FIG. 2 is a scanning electron microscope image of the liquid nitrogen quenching section of the wood-plastic composite prepared in Example 1; it can be seen from FIG. 2 that the interface of wood powder and plastic matrix is well combined.

Figure 3:
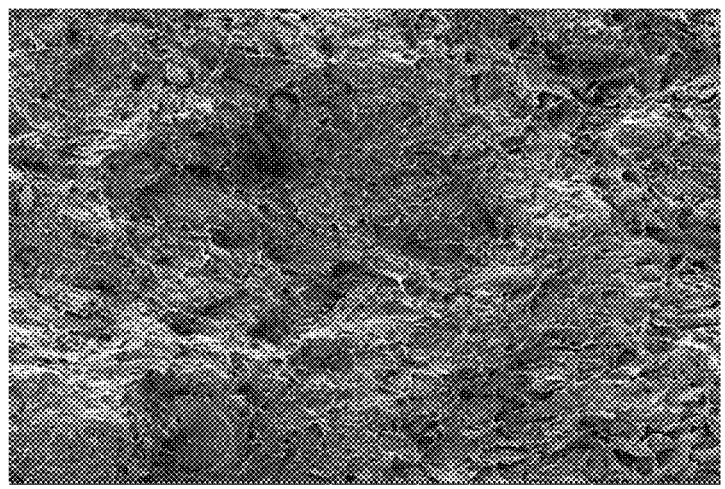
FIG. 3 is a scanning electron microscope image of the impact section of the wood-plastic composite prepared in Example 1.

FIG. 3 is a scanning electron microscope image of the impact section of the wood-plastic composite prepared in Example 1, it can be seen from FIG. 3 that the plastic ductile deformation occurs when the wood-plastic composite is broken, which is beneficial to the improvement of the toughness of the wood-plastic composite.

Example 2

Preparation raw materials: in parts by mass, 40 parts of eucalyptus wood flour, 16.5 parts of high molecular weight polyethylene (model 2080), 38.5 parts of polypropylene, 5 parts of maleic anhydride grafted polypropylene, and the mass of antioxidant 1010 was 0.1% of the mass of high molecular weight polyethylene;

The eucalyptus wood flour, high molecular weight polyethylene, polypropylene, maleic anhydride grafted polypropylene, and antioxidant 1010 were mixed in a high-speed mixer at a speed of 500 rpm for 15 min at room temperature;

The mixed raw materials were extruded using an eccentric rotor extruder, the temperature of each heating section of the eccentric rotor extruder from feeding to the die heat was 150° C., 200° C., and 200° C., respectively, the rotation speed of the eccentric rotor extruder was set to 30 rpm, to get a block material;

The above-mentioned block material was molded by a hot press to obtain a wood-plastic composite.

Example 3

Preparation raw materials: in parts by mass, 30 parts of eucalyptus wood flour, 13 parts of high molecular weight polyethylene (model 2080), 52 parts of polypropylene, 5 parts of maleic anhydride grafted polypropylene, and the mass of antioxidant 1010 was 0.1% of the mass of high molecular weight polyethylene;

The eucalyptus wood flour, high molecular weight polyethylene, polypropylene, maleic anhydride grafted polypropylene, and antioxidant 1010 were mixed in a high-speed mixer at a speed of 500 rpm for 15 min at room temperature;

The mixed raw materials were extruded using an eccentric rotor extruder, the temperature of each heating section of the eccentric rotor extruder from feeding to the die heat was 150° C., 200° C., and 200° C., respectively, the volumetric pulsation deformation plasticizing transport processing device of the eccentric rotor was set at a rotation speed of 30 rpm, to get a block material;

The above-mentioned block material was molded by a hot press to obtain a wood-plastic composite material.

Example 4

Preparation raw materials: in parts by mass, 40 parts of eucalyptus wood flour, 11 parts of high molecular weight polyethylene (model 2020), 44 parts of polypropylene, 5 parts of maleic anhydride grafted polypropylene, and the mass of antioxidant 1010 was 0.1% of the mass of high molecular weight polyethylene;

The eucalyptus wood flour, high molecular weight polyethylene, polypropylene, maleic anhydride grafted polypropylene, and antioxidant 1010 were mixed in a high-speed mixer at a speed of 500 rpm for 15 min at room temperature;

The mixed raw materials were extruded using an eccentric rotor extruder, the temperature of each heating section of the eccentric rotor extruder from feeding to the die heat was 150° C., 200° C., and 200° C., respectively, the rotation speed of the eccentric rotor extruder was set to 30 rpm, to get a block material;

The above-mentioned block material was molded by a hot press to obtain a wood-plastic composite material.

Example 5

Preparation raw materials: in parts by mass, 40 parts of eucalyptus wood flour, 11 parts of high molecular weight polyethylene (model 2080), 44 parts of polypropylene, 5 parts of maleic anhydride grafted polypropylene, and the mass of antioxidant 1010 was 0.1% of the mass of high molecular weight polyethylene;

The eucalyptus wood flour, high molecular weight polyethylene, polypropylene, maleic anhydride grafted polypropylene, and antioxidant 1010 were mixed in a high-speed mixer at a speed of 500 rpm for 15 min at room temperature;

The mixed raw materials were extruded using a twin-screw extruder, and the temperature of each heating section from the feeding to the die heat was 120° C., 135° C., 160° C., 190° C., 190° C., and 185° C., respectively, and the rotation speed was 80 rpm to obtain a granular material;

The above-mentioned granular material was molded by a hot press to obtain a wood-plastic composite.

Example 6

Preparation raw materials: in parts by mass, 40 parts of eucalyptus wood flour, 11 parts of high molecular weight polyethylene (model 2020), 44 parts of polypropylene, 5 parts of maleic anhydride grafted polypropylene, and the mass of antioxidant 1010 was 0.1% of the mass of high molecular weight polyethylene;

The eucalyptus wood flour, high molecular weight polyethylene, polypropylene, maleic anhydride grafted polypropylene, and antioxidant 1010 were mixed in a high-speed mixer at a speed of 500 rpm for 15 min at room temperature;

The mixed raw materials were extruded using a twin-screw extruder, and the temperature of each heating section from the feeding to the die heat was 120° C., 135° C., 160° C., 190° C., 190° C., and 185° C., respectively, and the rotation speed was 80 rpm to obtain a granular material;

The above-mentioned granular material was molded by a hot press to obtain a wood-plastic composite material.

Comparative Example 1

The wood-plastic composite material provided by this comparative example was prepared by the following method:

Preparation raw materials: in parts by mass, 40 parts of eucalyptus wood flour, 11 parts of high molecular weight polyethylene (model 2080), 44 parts of polypropylene, 5 parts of maleic anhydride grafted polypropylene, and the mass of antioxidant 1010 was 0.1% of the mass of high molecular weight polyethylene;

The eucalyptus wood flour, high molecular weight polyethylene, polypropylene, maleic anhydride grafted polypropylene, and antioxidant 1010 were mixed in a high-speed mixer at a speed of 500 rpm for 15 min at room temperature;

The mixed raw materials were kneaded in an internal mixer, the temperature of the internal mixer was set at 190° C., the rotation speed of the internal mixer was 60 rpm, and the mixing time was 8 min, to obtain a block material;

The above-mentioned block material was molded by a hot press to obtain a wood-plastic composite.

Comparative Example 2

The conventional wood-plastic composite material provided in this comparative example was prepared by the following method:

Preparation raw materials: in parts by mass, 40 parts of eucalyptus wood flour, 40 parts of polypropylene, 15 parts of EPDM rubber, and 5 parts of maleic anhydride grafted polypropylene;

The eucalyptus wood flour, polypropylene, EPDM rubber, and maleic anhydride grafted polypropylene were mixed in a high-speed mixer at a speed of 500 rpm for 15 min at room temperature;

The mixed raw materials were extruded using a twin-screw extruder, and the temperature of each heating section from the feeding to the die heat was 120° C., 135° C., 160° C., 190° C., 190° C., and 185° C., respectively, and the rotation speed was 80 rpm, to obtain a granular material;

The above-mentioned granular material was molded by a hot press to obtain a wood-plastic composite.

Comparative Example 3

The conventional wood-plastic composite material provided in this comparative example was prepared by the following method:

Preparation raw materials: in parts by mass, 40 parts of eucalyptus wood flour, 45 parts of polypropylene, and 15 parts of maleic anhydride grafted EPDM rubber;

The eucalyptus wood flour, polypropylene, and maleic anhydride grafted EPDM rubber were mixed in a high-speed mixer at a speed of 500 rpm for 15 min at room temperature;

The mixed raw materials were extruded using a twin-screw extruder, and the temperature of each heating section from the feeding to the die heat was 120° C., 135° C., 160° C., 190° C., 190° C., and 185° C., respectively, and the rotation speed was 80 rpm, to obtain a granular material;

The above-mentioned granular material was molded by a hot press to obtain a wood-plastic composite material.

Performance Testing

The wood-plastic composites prepared in Examples 1-6 and Comparative examples 1-3 were tested, wherein the tensile strength was determined according to "GB/T 1040.2 Determination of Tensile Properties of Plastics Part 2: Testing Conditions of Molded and Extruded Plastics", the bending strength and bending modulus were determined according to "GB/T 9341-2008 Determination of Bending Properties of Plastics", and the impact strength was determined according to "GB/T1843 Determination of Impact Strength of Plastics". The specific test results are shown in Table 1.

TABLE 1

Performance test results of wood-plastic composites prepared in Examples and Comparative Examples

|  | tensile strength (MPa) | bending strength (MPa) | bending modulus (MPa) | impact strength (kJ/m$^2$) |
| --- | --- | --- | --- | --- |
| Example 1 | 28.7 | 55.2 | 2508 | 33.7 |
| Example 2 | 27.4 | 50.6 | 2215 | 37.6 |
| Example 3 | 25.3 | 47.5 | 1973 | 42.4 |
| Example 4 | 27.2 | 52.3 | 2328 | 30.5 |
| Example 5 | 23.3 | 44.2 | 1986 | 20.1 |
| Example 6 | 22.9 | 42.6 | 1924 | 19.5 |
| Comparative Example 1 | 19.4 | 38.4 | 1833 | 16.8 |
| Comparative Example 2 | 15.2 | 29.6 | 883 | 40.3 |
| Comparative Example 3 | 16.7 | 31.4 | 920 | 41.4 |

As can be seen from Table 1, compared with wood-plastic composites processed by other processing methods (Comparative Example 1) and other elastomer-toughened wood-plastic composites (Comparative Examples 2-3), the wood-plastic composites obtained by the method provided in the invention have better strength and good toughness.

The above are only the preferred embodiments of the present invention. It should be pointed out that for those of ordinary skill in the art, without departing from the principle of the present invention, several improvements and modifications can be made, and these improvements and modifications are also should be regarded as the protection scope of the present invention.

What is claimed is:

1. A wood-plastic composite comprising the following preparation raw materials in parts by mass: 30-50 parts of wood flour, 11-20 parts of polyethylene, 30-52 parts of polypropylene, and 2-10 parts of an interface modifier, wherein the polyethylene has a viscosity average molecular weight of 400,000-800,000 and the wood-plastic composite is prepared by a method comprising:

mixing the preparation raw materials to obtain a mixture and extruding the mixture using an extruder to obtain the wood-plastic composite, the extruder being an eccentric rotor extruder and having temperatures of each heating section from feeding to die heat of 130-150° C., 190-210° C., and 190-210° C., respectively.

2. The wood-plastic composite according to claim 1, wherein the interfacial modifier comprises one or more selected from the group consisting of maleic anhydride grafted polyethylene, maleic anhydride grafted polypropylene, and maleic anhydride grafted EPDM rubber.

3. The wood-plastic composite according to claim 1, wherein a particle size of the wood flour is 40-100 mesh.

4. The wood-plastic composite according to claim 1, further comprising an antioxidant, wherein a mass of the antioxidant is 0.1-0.3% of a mass of the polyethylene.

* * * * *